(12) United States Patent
Elkins et al.

(10) Patent No.: US 8,666,089 B2
(45) Date of Patent: Mar. 4, 2014

(54) ADAPTIVE NIGHT-TIME HIGH DEFINITION (HD) SIGNAL SENSITIVITY THRESHOLD FOR HD RADIO RECEIVERS

(75) Inventors: Charles Ray Elkins, Commerce, MI (US); Dave Richard Tengler, West Bloomfield, MI (US); James W. Helmke, Highland, MI (US)

(73) Assignee: Ford Global Technologies, Dearborn, MI (US)

( * ) Notice: Subject to any disclaimer, the term of this patent is extended or adjusted under 35 U.S.C. 154(b) by 315 days.

(21) Appl. No.: 13/326,497

(22) Filed: Dec. 15, 2011

(65) Prior Publication Data

US 2013/0156130 A1 Jun. 20, 2013

(51) Int. Cl.
*H04B 1/00* (2006.01)
*H04B 1/18* (2006.01)

(52) U.S. Cl.
USPC .... 381/86; 455/161.3; 455/184.1; 455/234.1; 455/345; 375/316

(58) Field of Classification Search
USPC ............. 381/86, 80; 455/161.3, 184.1, 234.1, 455/345; 375/316
See application file for complete search history.

(56) References Cited

U.S. PATENT DOCUMENTS

| | | | |
|---|---|---|---|
| 4,723,319 A * | 2/1988 | Stricker | ..... 455/161.3 |
| 5,465,406 A | 11/1995 | Whitecar et al. | |
| 5,613,230 A | 3/1997 | Gottfried et al. | |
| 5,930,693 A | 7/1999 | Kennedy et al. | |
| 7,298,328 B2 | 11/2007 | Wang et al. | |

* cited by examiner

*Primary Examiner* — Vivian Chin
*Assistant Examiner* — Paul Kim
(74) *Attorney, Agent, or Firm* — Angela M. Brunetti; Frank MacKenzie

(57) ABSTRACT

A vehicle has a lighting control module and a HD radio receiver. The lighting control module provides an indication of daytime operation of the vehicle and an indication of night-time operation of the vehicle. The HD radio receiver is configured for selecting between outputting digital format audio content of a radio signal and outputting analog format audio content of the HD radio signal dependent upon a HD signal sensitivity threshold. The HD radio receiver sets the HD signal sensitivity threshold to one of a plurality of different night-time HD signal sensitivity threshold values as a function of a signal strength characteristic of the HD radio signal when the lighting control module provides the indication of night-time operation thereto. The HD radio receiver sets the HD signal sensitivity threshold to a daytime HD signal sensitivity threshold value when the lighting control module provides the indication of daytime operation thereto.

20 Claims, 2 Drawing Sheets

ADAPTIVE NIGHT-TIME HIGH DEFINITION (HD) SIGNAL SENSITIVITY THRESHOLD FOR HD RADIO RECEIVERS

FIELD OF THE DISCLOSURE

The disclosures made herein relate generally to signal processing in high definition (HD) radio receivers and, more particularly, to providing for an adaptive night-time HD signal sensitivity threshold in HD radio receivers.

BACKGROUND

HD radio technology upgrades broadcast radio from analog to digital. Audio content is digitally compressed and broadcast by a transmitter designed specifically for broadcasting digital radio signals and corresponding analog radio signals carrying the same audio content as a respective digital radio signal over the airwaves on the same broadcast frequency. Content of a digital radio signal can also include textual information. HD radio, receivers are configured for allowing the analog radio signal and the digital radio signal to be separately processed for output of corresponding content (e.g., the audio content). When the HD radio receiver is tuned to an HD station, the audio content is output using the digital radio signal unless, as described below, the need arises to output the audio content using the analog radio signal. Ibiquity Digital Corporation is one example of a source for commercial implementations of HD radio technology.

Typical HD radio receivers have a threshold for the quality of the digital radio signal they are receiving. Break-up of the digital radio signal causes dead spots in the output of the audio content corresponding to the digital radio signal. However, instead of dropping the digital radio signal that is being broadcast by a radio station and letting output of the audio content cease, the HD radio receiver makes a decision to fall back to a corresponding analog radio signal that is being broadcast by the radio station in combination with the digital radio signal.

With regard to radio signals in the broadcast frequency range of between about 540 KHz and about 1700 KHz, which is generally considered to be the amplitude modulation (AM) radio signal band, the HD radio receiver makes the decision to fall back from signal processing (i.e., audio content delivery) of a digital radio signal to signal processing of a corresponding analog radio signal based on HD signal quality such as determined by a digital signal processor of the HD radio receiver. For daytime operation of the HD radio receiver, the HD signal sensitivity threshold value is selected for maximum sensitivity, which maximizes digital radio signal reception.

At night-time, however, utilizing an HD signal sensitivity threshold value that causes the HD radio receiver to quickly switch from the analog radio signal to the digital radio signal can be problematic. This is because, after the sunset (i.e., at night-time), the strength of AM band radio signals is highly variable due to conditions such as variability in signal sky-wave propagation. Signal sky-wave propagation refers to non-line-of-sight signal transmission resulting from radio signals that reflect (e.g., skip) off of an ionosphere portion of the atmosphere and return to Earth many hundreds of miles away. However, variations occur in such signal sky-wave propagation as a function of the sun's heating of the ionosphere during the daytime and associated cooling of the ionosphere after sunset. Accordingly, AM band radio signal fluctuations resulting from variations in signal sky-wave propagation can lead to undesired transitions between signal processing of corresponding digital and analog radio signals due to degradation of HD radio signals in combination with variability in night-time AM band radio signal strength characteristic.

Prior art HD radio receivers have utilized a common HD signal sensitivity threshold value for both daytime and night-time radio operation. However, as a result of AM band radio signal strength variation, such prior art HD radio receivers exhibit the undesirable tendency of transitioning between corresponding digital and analog radio signals (i.e., analog/digital mode transitions) too often at night-time when tuned to stations in the AM radio signal band. These signal processing transitions between the corresponding digital and analog radio signals are apparent to a listener of a prior art HD radio receiver as a choppy audio content delivery (i.e., poor radio signal processing). Therefore, a solution for limiting excessive signal processing transitions between corresponding digital and analog radio signals at night-time would overcome shortcomings associated with prior art HD radio receivers, thus making such solution advantageous, desirable and useful.

SUMMARY OF THE DISCLOSURE

Embodiments of the inventive subject matter are directed to a solution for limiting a high definition (HD) radio receiver from being prone to excessive signal processing transitions between corresponding digital and analog radio signals during operation at night-time when tuned to a particular radio station in the AM radio signal band. More specifically, HD signal sensitivity threshold values for the HD radio receiver are selected based on night-time or daytime operation of the HD radio receiver and whether a night-time AM radio signal strength for the particular radio station is considered to be relatively weak or relatively strong. By implementing HD signal sensitivity threshold value selection in this manner for an HD radio receiver, undesired transitioning between corresponding digital and analog radio signals for a radio station, particularly during night-time operation of the HD radio receiver, can be reduced relative to prior art implementations of HD radio receivers. Furthermore, implementing HD signal sensitivity threshold value selection in this manner also offers flexibility to maintain a more sensitive HD signal sensitivity threshold for truly stronger stations, so as to limit signal processing transitions between corresponding digital and analog radio signal that often result from driving the vehicle beneath grounded conductive structures (e.g., underpasses). Because grounded conductive structures degrade the quality of AM band radio signals, an HD signal sensitivity threshold value that provides for high sensitivity to analog-to-digital radio signal processing transitions is required to maintain HD signal processing when passing through/below grounded conductive structures.

In one embodiment of the inventive subject matter, a vehicle comprises a lighting control module and a HD radio receiver. The lighting control module provides an indication of daytime operation of the vehicle and an indication of night-time operation of the vehicle. The HD radio receiver is configured for selecting between outputting digital format audio content of a radio signal and outputting analog format audio content of the HD radio signal dependent upon a HD signal sensitivity threshold. The HD radio receiver sets the HD signal sensitivity threshold to one of a plurality of different night-time HD signal sensitivity threshold values as a function of a signal strength characteristic of the HD radio signal when the lighting control module provides the indication of night-time operation thereto. The HD radio receiver sets the HD signal sensitivity threshold to a daytime HD signal sensitivity threshold value when the lighting control module provides the indication of daytime operation thereto.

In another embodiment of the inventive subject matter, a HD radio receiver comprises an operating mode determiner, a signal strength characteristic determiner, and a HD signal sensitivity threshold adjuster. The operating mode determiner is configured for determining a time of day dependent operating mode for the HD radio receiver. The signal strength characteristic determiner is configured for determining a signal strength characteristic of a radio signal for a station to which the HD radio receiver is tuned. The HD signal sensitivity threshold adjuster is configured for setting a HD signal sensitivity threshold value of the HD radio receiver as a function of the operating mode and, when it is determined that the operating mode corresponds to night-time operation rather than daytime operation, setting the HD signal sensitivity threshold value of the HD radio receiver as both a function of the operating mode and a function of the HD radio signal strength characteristic.

In another embodiment of the inventive subject matter, a method comprises a plurality of operations. An operation is performed for determining a time of day dependent operating mode for a HD radio receiver. An operation is performed for setting a HD signal sensitivity threshold of the HD radio receiver to a daytime HD signal sensitivity threshold value in response to determining that the operating mode is dependent upon daytime operation of the HD radio receiver. An operation is performed for determining a signal strength characteristic of a radio signal of a station to which the HD radio receiver is tuned in response to determining that that the operating mode is dependent upon night-time operation of the HD radio receiver. An operation is performed for setting a value of the HD signal sensitivity threshold of the HD radio receiver as a function of the signal strength characteristic of the HD radio signal in response to determining the signal strength characteristic of the HD radio signal.

These and other objects, embodiments, advantages and/or distinctions of the inventive subject matter will become readily apparent upon further review of the following specification, associated drawings and appended claims.

DETAILED DESCRIPTION OF THE DRAWING FIGURES

Figure 1:
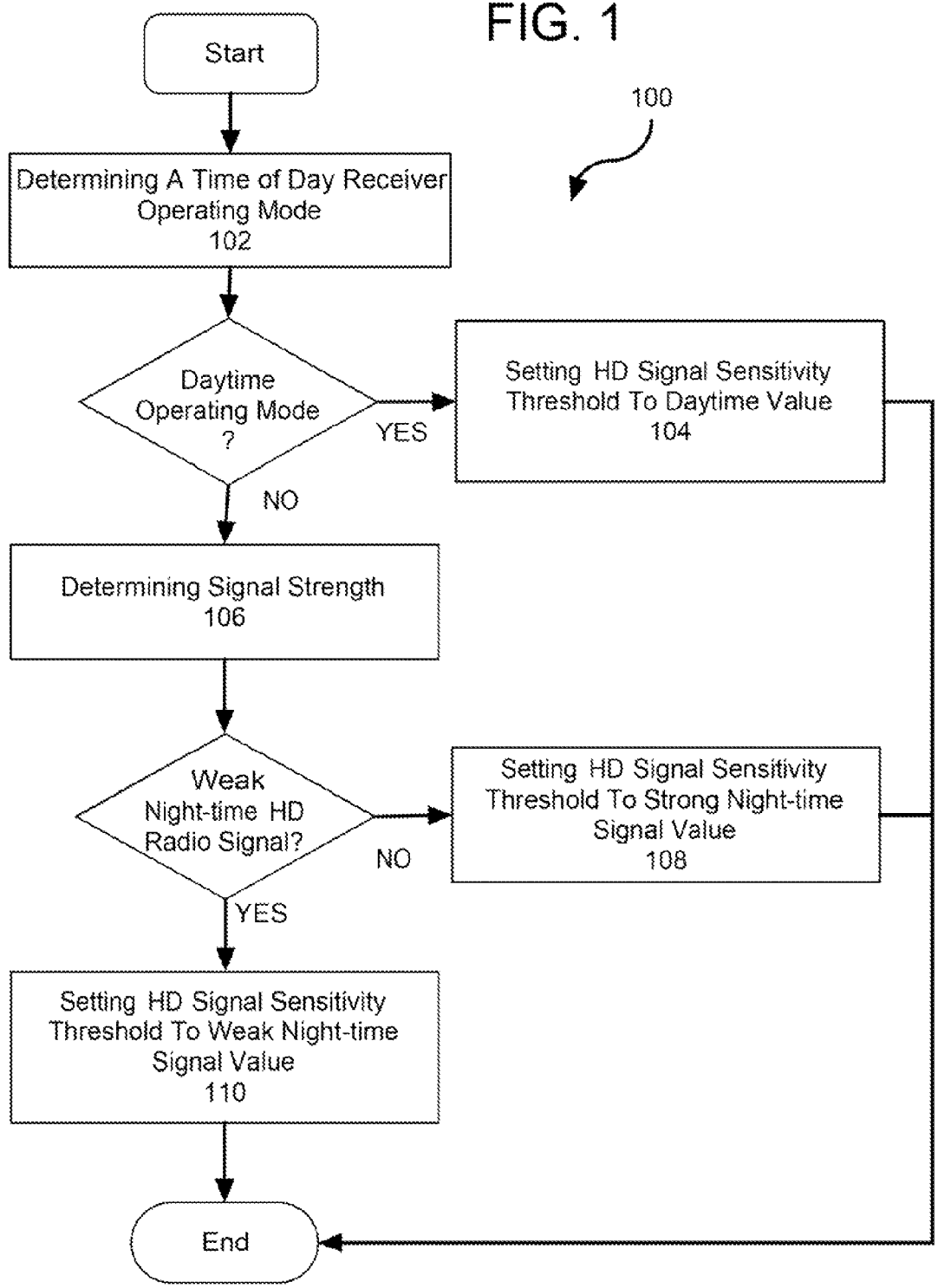
FIG. 1 is a flow diagram showing a method for setting a HD signal sensitivity threshold of an HD radio receiver in accordance with the inventive subject matter.

In known HD radio systems, a HD radio signal includes a digital portion (i.e., a digital radio signal) and a corresponding analog portion (i.e., a corresponding analog radio signal). The digital radio signal carries a digitally formatted version of audio content and the corresponding analog radio signal carries an analogically formatted version of the audio content. The digital radio signal is implemented at subcarrier frequencies (i.e., subcarriers) that are located within the frequency spectrum contained within an allowed spectral mask associated with the HD radio signal. The HD radio receiver can deliver the audio content digitally (i.e., digital audio content) whenever it can lock onto the digital radio signal and decode the information of the digital radio signal with an acceptable quality level. The quality of the HD signal is dependent on a Bit Error Rate (BER). The HD radio receiver employs various error correction schemes to manage the BER for the purpose of optimizing audio content delivery using the digital radio signal. However, when the BER becomes overwhelming (e.g., a BER threshold exceeded), the HD radio receiver can no longer maintain acceptable HD signal quality and, thus, it reverts to delivering the audio content using the corresponding analog radio signal.

BER can become overwhelming to error correction capabilities of an HD radio receiver for any number of reasons. On reason is a HD radio signal that has a low signal level (i.e., low signal strength). As previously mentioned, the digital portion of the HD radio signal is limited to being contained within the spectral mask, which was originally intended to be a limit on the noise output of the radio transmitter. As a result, the digital radio signal has relatively low signal strength (i.e., is weak) compared to the analog radio signal, which can result in the loss of the digital radio signal (i.e., ability to reliably process such signal) before the analog radio signal is lost. Another reason is the digital information being corrupted by undesired noise sources (e.g., signal interference), which impairs the ability of the error correction mechanism(s) of the HD radio receiver to maintain an acceptable BER for a given signal level.

Embodiments of the inventive subject matter are directed to mitigating the effects caused by interference resulting from skywave propagation, which has been discussed above. Although skywave propagation enables radio signals in the AM radio signal band to travel far beyond distances associated with line-of-sight transmission, such skywave transmitted radio signals typically exhibit signal strength that tends to vary significantly over a short period of time (e.g., over several seconds or less). As such, skywave propagation can be unfavorable for HD radio operation for several reasons. One reason is that, during delivery of audio content processed from a skywave propagated HD radio signal, the signal strength of the HD radio signal fluctuates up and down, which drives the BER high and low. This can result in excessive transitioning between audio content delivery using the digital portion of the HD radio signal and audio content delivery using the analog portion of the HD radio signal. Such excessive transitioning leads to poor audio quality (e.g., in the form of choppy, non-contiguous audio clarity). Another reason is that, while listening to a stable digital radio signal (i.e., the digital portion of an HD radio signal) that is near a BER threshold, the emergence of a skywave signal on that channel can also impair the reception of the HD subcarriers associated with that channel such as for example due to the HD radio signal encompassing portions of 5 broadcast channels (e.g., the tuned channel, two above and two below). As such, BER performance is negatively impacted.

Embodiments of the inventive subject matter can enhance the content delivery experience for both of these cases of skywave propagation unfavorably impacting HD radio operation. In the case of skywave propagation causing signal strength fluctuations, embodiments of the inventive subject matter can artificially increase the signal level required to engage delivery of audio content using the digital radio signal at night via a higher HD signal sensitivity threshold, thereby forcing stations relying on skywave radio signal transmission to delivery corresponding audio content using only the analog portion of the HD radio signal reception only. Preventing distant stations from becoming digital will avoid the transitions altogether. In the case of a skywave signal emerging on a channel of a stable digital radio signal that is near a BER threshold and impairing the reception of the HD subcarriers, embodiments of the inventive subject matter can provide for a higher HD signal sensitivity threshold level (i.e., a first night-time HD signal sensitivity threshold) for a borderline station thereby decreasing the probability that the skywave interference will result in troublesome BER issues. To prevent unintended consequences, however, once a station actually does overcome the HD signal sensitivity threshold required to engage HD content delivery mode, the HD signal sensitivity threshold is preferably reduced to a lower level (i.e., a second night-time HD signal sensitivity threshold). This hysteresis can help avoid loss of potential HD coverage, due to situations such as grounded conductive structures (bridges/overpasses) causing a conversion to the analog radio signal processing mode, but the signal strength drops to below the original limit, so it is forced to stay in the analog radio signal processing mode. In such an implementation of the inventive subject matter, the reduced HD radio signal sensitivity threshold should revert to the higher (e.g., the first) night-time HD signal sensitivity threshold whenever the HD radio receiver is tuned to a new station.

Referring now to FIG. 1, a method 100 for setting a HD signal sensitivity threshold in an HD radio receiver is presented. The method 100 is particularly well-suited for addressing the abovementioned issues associated with signal processing on an HD radio signal in the AM radio signal band. However, it is disclosed herein that the method 100 can be implemented for an HD radio signal that is not within that is commonly considered to be the AM radio signal band.

The method 100 begins with an operation 102 for determining a time of day receiver operating mode. It is disclosed herein that determining a time of day receiver operating mode can include receiving a signal indicating a time of day operating mode from a lighting control module (e.g., a signal configured dependent upon information provided by a light sensor and/or a headlamp switch). In response to determining that the operating mode is dependent upon daytime operation of the HD radio receiver, an operation 104 is performed for setting a HD signal sensitivity threshold of the HD radio receiver to a daytime HD signal sensitivity threshold value. In response to determining that that the operating mode is dependent upon night-time operation of the HD radio receiver, an operation 106 is performed for determining a signal strength characteristic of an HD radio signal of a station to which the HD radio receiver is tuned. In a preferred embodiment, the signal strength characteristic is an average signal strength of the HD radio signal over a defined duration of time. When it is determined that the signal strength characteristic of the HD radio signal is above a signal strength characteristic threshold, an operation 108 is performed for setting the HD signal sensitivity threshold to a first night-time HD signal sensitivity threshold value. When it is determined that the signal strength characteristic of the HD radio signal is below the signal strength characteristic threshold, an operation 110 is performed for setting the value of the HD signal sensitivity threshold to a second night-time HD signal sensitivity threshold value that provides for substantially less HD radio signal sensitivity than the first night-time HD signal sensitivity threshold value.

HD signal sensitivity refers to a power level that an HD radio signal must exceed (e.g., for at least a defined period of time) in order for the HD radio receiver to transition from providing audio content delivery using an analog radio signal to providing such audio content delivery using a corresponding digital radio signal. It should be understood that embodiments of the present are intended to control the engagement of digital signal processing mode (i.e., audio content delivery using the digital radio receiver) from an analog signal processing mode (i.e., audio content delivery using the corresponding analog radio receiver), but not disengagement of the digital signal processing mode. More specifically, the signal level required to enter digital signal processing mode will be elevated for night-time operation (at least for the weak HD radio signal case). But, once in digital signal processing mode, the HD radio receiver will stay in HD as long as it can. In this regard, embodiments of the inventive subject matter do not force an early exit from the digital signal processing mode once the digital signal processing mode has already been established.

In some embodiments of the inventive subject matter, it will be preferred for the first night-time HD signal sensitivity threshold value to be equal to (e.g., approximately equal to) the daytime HD signal sensitivity threshold value. Furthermore, in some embodiments of the inventive subject matter, it will be preferred for the daytime night-time HD signal sensitivity threshold to provide for substantially greater HD radio signal sensitivity (i.e., numerically smaller HD signal sensitivity threshold value) than the first night-time HD signal sensitivity threshold. Specification of the various HD signal sensitivity threshold values can be determined during development of the HD radio receiver such as, for example, through field/road testing to determine optimal daytime and night-time performance for the HD radio receiver.

With regard to specific examples of HD signal sensitivity threshold values, it is disclosed herein that the daytime HD signal sensitivity threshold value and the night-time HD signal sensitivity threshold value can each be about from 35 dBuV and the second night-time HD signal sensitivity threshold value can be about 50 dBuV. Alternatively, in the case where the daytime night-time HD signal sensitivity threshold provides for greater sensitivity to digital radio signal strength than the first night-time HD signal sensitivity threshold value, the first night-time HD signal sensitivity threshold value can be less than about 50 dBuV. Although these specific values are stated as examples, a skilled person will appreciate that the inventive subject matter is not unnecessarily limited to any particular values for the various HD signal sensitivity thresholds.

Figure 2:
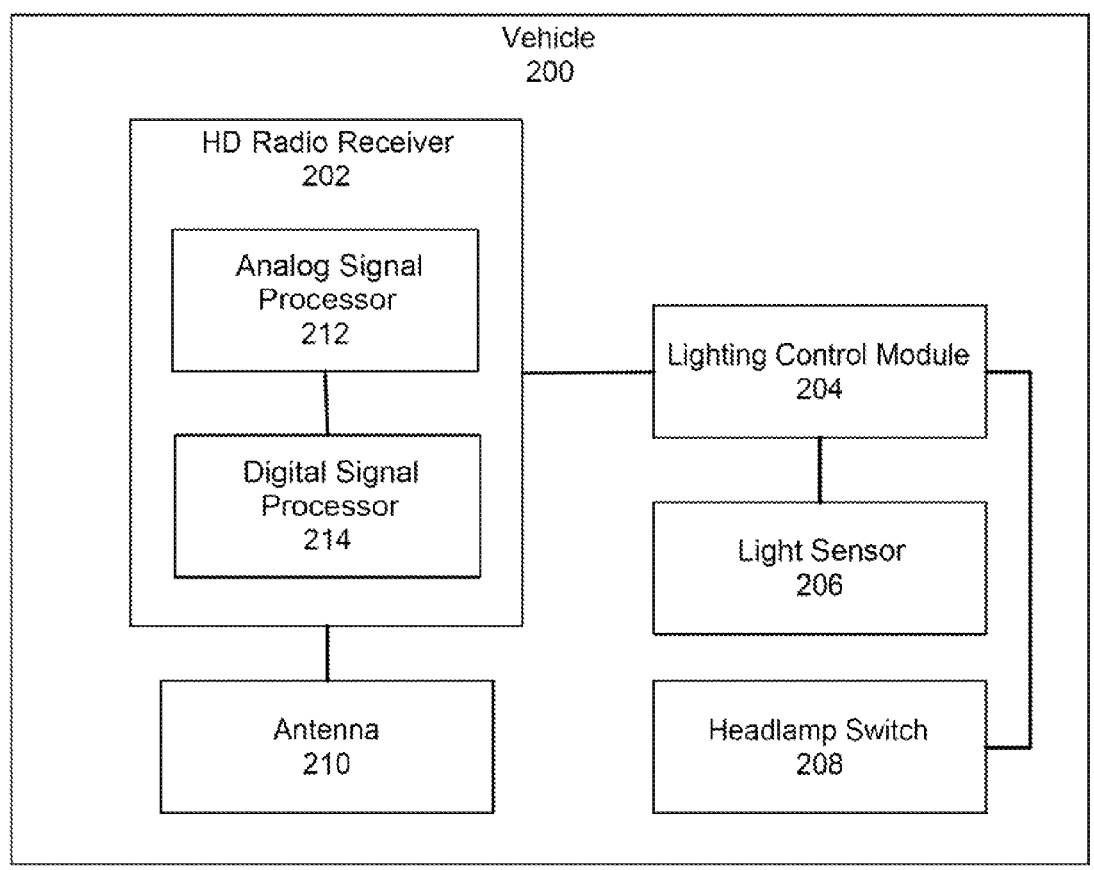
FIG. 2 is a block diagram showing a vehicle configured for providing HD signal sensitivity threshold setting functionality in accordance with an embodiment of the inventive subject matter.

FIG. 2 shows a vehicle 200 configured in accordance with an embodiment of the inventive subject matter. The vehicle 200 includes a HD radio receiver 202, a lighting control module 204, a light sensor 206, a headlamp switch 208, and an antenna 210. The lighting control module 204 is connected between the HD radio receiver 202, the light sensor 206, and the headlamp switch 208. The antenna 210 is coupled to the HD radio receiver 202. The HD radio receiver 202 includes an analog signal processor 212 and a digital signal processor 214 connected to the analog signal processor 212.

In some embodiments of the inventive subject matter, the analog signal processor 212 is integral with an analog tuner portion of the HD radio receiver 202 (e.g., an amplitude modulation (AM)/frequency modulation (FM) tuner) and the digital signal processor 214 is integral with a digital tuner portion of the HD radio receiver 202 (e.g., a HD tuner). The analog signal processor 212 and the digital signal processor 214 can each receive an HD radio signal from the antenna 210 or the HD radio signal can be provided to the digital signal processor 214 by the analog signal processor 212. The HD radio receiver 202 can be integral with an audio control module or can be a standalone component with respect to an audio control module. Jointly, the analog signal processor 212 and the digital signal processor 214 define a HD signal processing module.

The HD radio receiver 202 is configured for selecting between outputting digital format audio content of an HD radio signal (i.e., HD audio content delivery) and outputting analog format audio content of the HD radio signal (i.e., analog audio content delivery) dependent upon the HD signal sensitivity threshold discussed above. The analog signal processor 212 receives and processes an analog portion of the HD radio signal for providing the analog audio content delivery and the digital signal processor 214 receives and processes a digital portion of the HD radio signal for providing digital audio content delivery. The digital signal processor 214 provides for BER management functionality for the purpose of maintaining acceptable quality of the digital audio content delivery.

The HD radio receiver 202 sets the HD signal sensitivity threshold to one of a plurality of different night-time HD signal sensitivity threshold values as a function of a signal strength characteristic (e.g., an average signal strength) of the HD radio signal when the HD radio receiver is operating in accordance with a night-time mode of operation. The HD radio receiver 202 sets the HD signal sensitivity threshold to a daytime HD signal sensitivity threshold value when the lighting control module is operating in accordance with a daytime mode of operation. The HD radio receiver 202 sets the HD signal sensitivity threshold to a first night-time HD signal sensitivity threshold value when the signal strength characteristic of the HD radio signal is above a signal strength characteristic threshold. The HD radio receiver 202 sets the HD signal sensitivity threshold to a second night-time HD signal sensitivity threshold value provides for substantially less digital radio signal sensitivity than the first night-time HD signal sensitivity threshold value when the signal strength characteristic of the HD radio signal is below the signal strength characteristic threshold. The first night-time HD signal sensitivity threshold value can be equal to the daytime HD signal sensitivity threshold value or the daytime night-time HD signal sensitivity threshold can provide for greater HD radio signal sensitivity than the first night-time HD signal sensitivity threshold.

With regard to time of day operating modes of the HD radio receiver 202, the lighting control module 204 provides the HD radio receiver 202 with an indication of daytime operation of the vehicle 200 and an indication of night-time operation of the vehicle. In some embodiments, the lighting control module 204 provides the indication of night-time operation as a function of a signal received from the light sensor 206, a signal received from the headlamp switch 208, or both. For example, the light sensor 206 can sense light to which the vehicle 200 is exposed, generate a corresponding light level value signal (e.g., a light level value signal corresponding to daytime and a light level value signal corresponding to night-time) and the lighting control module 204 can provide the indication of daytime operation when the light level value signal corresponds to the light exceeding a light level threshold and provides the indication of night-time operation when the light level value signal corresponds to the light not exceeding the light intensity threshold. In another example, the headlamp switch 208 can be moveable between a first position in which headlights of the vehicle are not illuminated and a second position in which the headlights of the vehicle are illuminated. The lighting control module 204 can provide the indication of daytime operation when the headlamp switch 208 is in the first position and can provide the indication of night-time operation when the headlamp switch 208 is in the second position.

In view of the disclosures made herein, a skilled person will appreciate that, logically, the HD radio receiver 202 provides for functionalities of an operating mode determiner, a signal strength characteristic determiner, and a HD signal sensitivity threshold adjuster. Logic and associated circuitry for determining the time of day dependent operating mode for the HD radio receiver (e.g., interpreting a signal from the lighting control module 204) represents the operating mode determiner. Logic and associated circuitry for determining the signal strength characteristic of a radio signal for a station to which the HD radio receiver 202 is tuned represents the signal strength characteristic determiner. Logic and associated circuitry for setting the HD signal sensitivity threshold value represented the HD signal sensitivity threshold adjuster. In embodiments where the HD radio receiver is integral with an audio control module, the operating mode determiner, the signal strength characteristic determiner, and/or the HD signal sensitivity threshold adjuster can be integral with the audio control module.

A HD signal control module in the context of the inventive subject matter can be any control module that provides for HD signal sensitivity threshold setting functionality in accordance with the inventive subject matter. Furthermore, it is disclosed herein that such a control module can be implemented within a standalone control module (physically and logically) or can be implemented logically within two or more separate but interconnected control modules. In one example, HD signal sensitivity threshold setting functionality in accordance with the inventive subject matter is implemented within a standalone control module that provides only audio system functionalities, which includes HD signal sensitivity threshold setting functionality. In another example, HD signal sensitivity threshold setting functionality in accordance with the inventive subject matter is implemented within a standalone control module that provides HD signal sensitivity threshold setting functionality as well as one or more other types of system control functionality of a vehicle. In still another example, HD signal sensitivity threshold setting functionality in accordance with the inventive subject matter is implemented logically in a distributed manner whereby a plurality of control units, control modules, computers, or the like jointly carry out operation for providing such HD signal sensitivity threshold setting functionality.

Referring now to instructions processible by a data processing device, it will be understood from the disclosures made herein that methods, processes and/or operations configured for setting a HD signal sensitivity threshold in an HD radio receiver are tangibly embodied by a non-transitory computer readable medium having instructions thereon that are configured for carrying out such functionality. In one specific embodiment, the instructions are tangibly embodied for carrying out the method 100 disclosed above. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. Accordingly, embodiments of non-transitory computer readable medium in accordance with the inventive subject matter include a compact disk, a hard drive, RAM or other type of storage apparatus that has imaged thereon a computer program (i.e., instructions) operations configured for setting a HD signal sensitivity threshold in an HD radio receiver in accordance with the inventive subject matter.

In the preceding detailed description, reference has been made to the accompanying drawings that form a part hereof, and in which are shown by way of illustration specific embodiments in which the inventive subject matter may be practiced. These embodiments, and certain variants thereof, have been described in sufficient detail to enable those skilled in the art to practice embodiments of the inventive subject matter. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vehicle, comprising:
   a lighting control module that provides an indication of daytime operation of the vehicle and an indication of night-time operation of the vehicle; and
   a high definition (HD) radio receiver configured for selecting between outputting digital format audio content of an HD radio signal and outputting analog format audio content of the HD radio signal dependent upon a HD signal sensitivity threshold, wherein the HD radio receiver sets the HD signal sensitivity threshold to one of a plurality of different night-time HD signal sensitivity threshold values as a function of a signal strength characteristic of the HD radio signal when the lighting control module provides the indication of night-time operation thereto and wherein the HD radio receiver sets the HD signal sensitivity threshold to a daytime HD signal sensitivity threshold value when the lighting control module provides the indication of daytime operation thereto.

2. The vehicle of claim 1 wherein the HD radio receiver sets the HD signal sensitivity threshold thereof to a first night-time HD signal sensitivity threshold value when the signal strength characteristic of the HD radio signal is above a signal strength characteristic threshold and to a second night-time HD signal sensitivity threshold value that provides for less HD radio signal sensitivity than the first night-time HD signal sensitivity threshold value when the signal strength characteristic of the HD radio signal is below the signal strength characteristic threshold.

3. The vehicle of claim 2 wherein the first night-time HD signal sensitivity threshold value is equal to the daytime HD signal sensitivity threshold value.

4. The vehicle of claim 2 wherein the daytime night-time HD signal sensitivity threshold provides for greater HD radio signal sensitivity than the first night-time HD signal sensitivity threshold.

5. The vehicle of claim 1 wherein the lighting control module provides the indication of night-time operation as a function of information received from at least one of a light sensor and a headlamp switch.

6. The vehicle of claim 1, further comprising:
   a light sensor coupled to the lighting control module, wherein the light sensor senses light to which the vehicle is exposed and generates a corresponding light level value signal and wherein the lighting control module provides the indication of daytime operation when the light level value signal corresponds to the light exceeding a light level threshold and provides the indication of night-time operation when the light level value signal does not correspond to the light exceeding the light intensity threshold.

7. The vehicle of claim 6 wherein the HD radio receiver sets the HD signal sensitivity threshold thereof to a first night-time HD signal sensitivity threshold value when the signal strength characteristic of the HD radio signal is above a signal strength characteristic threshold and to a second night-time HD signal sensitivity threshold value that provides for less HD radio signal sensitivity than the first night-time HD signal sensitivity threshold value when the signal strength characteristic of the HD radio signal is below the signal strength characteristic threshold.

8. The vehicle of claim 1, further comprising:
   a headlamp switch coupled to the lighting control module, wherein the headlamp switch is moveable between a first position in which a headlight of the vehicle is not illuminated and a second position in which the headlight of the vehicle is illuminated and wherein the lighting control module provides the indication of daytime operation when the headlamp switch is in the first position and provides the indication of night-time operation when the headlamp switch is in the second position.

9. The vehicle of claim 8 wherein the HD radio receiver sets the HD signal sensitivity threshold thereof to a first night-time HD signal sensitivity threshold value when the signal strength characteristic of the HD radio signal is above a signal strength characteristic threshold and to a second night-time HD signal sensitivity threshold value that provides for less HD radio signal sensitivity than the first night-time HD signal sensitivity threshold value when the signal strength characteristic of the HD radio signal is below the signal strength characteristic threshold.

10. A high definition (HD) radio receiver, comprising:
    an operating mode determiner for determining a time of day dependent operating mode for the HD radio receiver;
    a signal strength characteristic determiner for determining a signal strength characteristic of a HD radio signal for a station to which the HD radio receiver is tuned; and
    a HD signal sensitivity threshold adjuster for setting a HD signal sensitivity threshold value of the HD radio receiver as a function of the operating mode and, when it is determined that the operating mode corresponds to night-time operation rather than daytime operation, setting the HD signal sensitivity threshold value of the HD radio receiver as both a function of the operating mode and a function of the HD radio signal strength characteristic.

11. The HD radio receiver of claim 10 wherein the HD signal sensitivity threshold adjuster sets the HD signal sensitivity threshold thereof to a first night-time HD signal sensitivity threshold value when the signal strength characteristic of the HD radio signal is above a signal strength characteristic threshold and to a second night-time HD signal sensitivity threshold value that provides for substantially less HD radio signal sensitivity than the first night-time HD signal sensitivity threshold value when the signal strength characteristic of the HD radio signal is below the signal strength characteristic threshold.

12. The HD radio receiver of claim 11 wherein the first night-time HD signal sensitivity threshold value is equal to the daytime HD signal sensitivity threshold value.

13. The HD radio receiver of claim 11 wherein the daytime night-time HD signal sensitivity threshold provides for greater HD radio signal sensitivity than the first night-time HD signal sensitivity threshold.

14. A method, comprising:
    determining a time of day dependent operating mode for a high definition (HD) radio receiver;
    setting a HD signal sensitivity threshold of the HD radio receiver to a daytime HD signal sensitivity threshold value in response to determining that the operating mode is dependent upon daytime operation of the HD radio receiver;

determining a signal strength characteristic of a radio signal of a station to which the HD radio receiver is tuned in response to determining that that the operating mode is dependent upon night-time operation of the HD radio receiver; and setting a value of the HD signal sensitivity threshold of the HD radio receiver as a function of the signal strength characteristic of the HD radio signal in response to determining the signal strength characteristic of the HD radio signal.

15. The method of claim 14 wherein setting the value of the HD signal sensitivity threshold of the HD radio receiver as a function of the signal strength characteristic of the HD radio signal includes:

setting the HD signal sensitivity threshold to a first night-time HD signal sensitivity threshold value when the signal strength characteristic of the HD radio signal is above a signal strength characteristic threshold; and setting the HD signal sensitivity threshold to a second night-time HD signal sensitivity threshold value that provides for substantially less HD radio signal sensitivity than the first night-time HD signal sensitivity threshold value when the signal strength characteristic of the HD radio signal is below the signal strength characteristic threshold.

16. The method of claim 15 wherein the first night-time HD signal sensitivity threshold value is equal to the daytime HD signal sensitivity threshold value.

17. The method of claim 15 wherein the daytime night-time HD signal sensitivity threshold provides for greater HD radio signal sensitivity than the first night-time HD signal sensitivity threshold.

18. The method of claim 14 wherein:

determining the time of day dependent operating mode includes receiving a signal from a lighting control module; and the lighting control module provides an indication of the daytime operation and an indication of the night-time operation.

19. The method of claim 14 wherein:

determining the time of day dependent operating mode includes receiving a signal from a light sensor;

the light sensor senses ambient light in an environment surrounding the HD radio receiver and generates a corresponding light level value signal; and the signal from the light sensor provides an indication of the daytime operation when the light level value signal exceeds a light level threshold and provides an indication of the night-time operation when the light level light does not exceed a light intensity threshold.

20. The method of claim 19 wherein setting the value of the HD signal sensitivity threshold of the HD radio receiver as a function of the signal strength characteristic of the HD radio signal includes:

setting the HD signal sensitivity threshold to a first night-time HD signal sensitivity threshold value when the signal strength characteristic of the HD radio signal is above a signal strength characteristic threshold; and setting the HD signal sensitivity threshold to a second night-time HD signal sensitivity threshold value that provides for substantially less HD radio signal sensitivity than the first night-time HD signal sensitivity threshold value when the signal strength characteristic of the HD radio signal is below the signal strength characteristic threshold.

\* \* \* \* \*